(12) United States Patent
Hedin

(10) Patent No.: US 6,255,991 B1
(45) Date of Patent: Jul. 3, 2001

(54) LOW COST ANGLE OF ARRIVAL MEASUREMENT SYSTEM

(75) Inventor: George L. Hedin, Escondido, CA (US)

(73) Assignee: TRW Inc., Redondo Beach, CA (US)

(*) Notice: Subject to any disclaimer, the term of this patent is extended or adjusted under 35 U.S.C. 154(b) by 0 days.

(21) Appl. No.: 09/487,507

(22) Filed: Jan. 19, 2000

(51) Int. Cl.[7] .................................................. G01S 5/02

(52) U.S. Cl. ........................ 342/424; 342/442; 342/444; 342/445

(58) Field of Search .................................. 342/156, 374, 342/424, 442, 444, 445

(56) References Cited

U.S. PATENT DOCUMENTS

| | | | |
|---|---|---|---|
| 4,481,519 | * 11/1984 | Margerum | 343/434 |
| 5,381,150 | * 1/1995 | Hawkins et al. | 342/13 |
| 5,457,466 | * 10/1995 | Rose | 342/442 |
| 5,574,468 | * 11/1996 | Rose | 342/442 |
| 5,608,411 | * 3/1997 | Rose | 342/417 |
| 5,936,575 | * 8/1999 | Azzarelli et al. | 342/362 |
| 5,999,129 | * 12/1999 | Rose | 342/394 |
| 6,011,514 | * 1/2000 | Frankovich et al. | 342/442 |

* cited by examiner

Primary Examiner—Dao Phan
(74) Attorney, Agent, or Firm—Robert W. Keller

(57) ABSTRACT

An interferometer antenna system (32) for measuring the angle of arrival of RF signals. The interferometer antenna system (32) includes a plurality of interferometer antenna elements (36) coupled to a first switching network (42). The first switching network (42) is coupled to only two interferometer receivers (44, 46). The first switching network (42) selectively connects the plurality of interferometer antenna elements (36) in pairs to the two interferometer receivers (44, 46) in a sequential manner, so that a phase difference is measured between the received signal for several of the pairs of the interferometer elements (36). Additionally, a plurality of guard antenna elements (38) are coupled to a second switching network (48). A single guard receiver (50) is coupled to the second switching network (48), where the second switching network (48) selectively connects one of the guard antenna elements (38) to the guard receiver (50) in a sequential manner. A controller (40) employs a suitable angle of arrival algorithm to generate a best estimate of the direction of the received signal based on the phase signals from the two interferometer receivers (44, 46) and the power signal from the guard receiver (50).

20 Claims, 2 Drawing Sheets

LOW COST ANGLE OF ARRIVAL MEASUREMENT SYSTEM

BACKGROUND OF THE INVENTION

1. Field of the Invention

This invention relates generally to an angle of arrival measurement system, and more particularly, to an angle of arrival interferometer measurement system for a received signal that has reduced complexity and cost over existing interferometer systems.

2. Discussion of the Related Art

Many situations exist where it is desirable to know the direction from which an RF signal is received. For example, it is desirable to use RF interrogation signals to determine the location of aircraft in flight for traffic separation purposes. An aircraft may transmit an RF beacon signal that is received by other aircraft in its vicinity. The aircraft that receives the beacon signal determines the direction and distance of the signal source to determine the location of the aircraft. The direction of the received signal can be used to map the location of the aircraft on a screen to determine its location relative to other aircraft. Signal direction or angle of arrival (AoA) estimations are also useful in certain military situations. U.S. patent application Ser. No. 09/404,387, filed Sep. 23, 1999, titled "An Interferometer Multi-Arm Antenna System for Accurate Angle of Arrival (AoA) Estimation" discusses providing AoA estimations in this type of environment.

Interferometer antenna systems and AoA estimation algorithms are used to make high precision measurements of the direction of arrival of RF signals. These interferometer systems typically use an antenna base line that includes a linear array of antenna elements separated by known distances. Receivers connected to the antenna elements measure the relative phases of the received RF signals. Digital processing algorithms then calculate the angle of arrival from the phase differences measured between the antenna elements. The spacing between the antenna elements is typically small integers or prime numbers related to half-wavelengths of the received signal to resolve ambiguities that arise as a function of frequency. Ambiguities occur as a result of the periodicity of the sine functions used in the algorithms to calculate the AoA estimates. The resulting ambiguities give several AoA estimation solutions of the direction of the received signal that have to be resolved to identify the actual direction. Guard antenna elements are oriented so that their beam patterns differ in such a way that by measuring the signal power received by them, algorithms can resolve the ambiguities that remain in the direction of arrival determined from the linear array.

FIG. 1 is a block diagram of a known antenna system 10 used to determine the direction of arrival of an RF signal. The antenna system 10 includes an interferometer antenna system 12 and a guard antenna system 14. The interferometer system 12 includes a plurality of antenna elements 16 positioned at predetermined distances from each other, typically at a ratio that is a small integer. Each of the antenna elements 16 is connected to a separate receiver 18 that measures the phase of the received signals. In this example, five interferometer antenna elements 16 are used, however, other numbers of antenna elements could be provided in other applications. In a desirable configuration, the antenna elements 16 are arranged in a linear array, such as along the leading edge of an aircraft wing, but can be configured along any desirable structure.

The guard antenna system 14 includes four antenna elements 20 that are arranged 90° apart from each other to provide directional sensitivity. Because the linear array of antenna elements 16 are only able to determine the direction of the signal within 360°, it is necessary to further define the direction of the signal by sensing received power from the elements 20. Each of the antenna elements 20 is connected to a separate receiver 22 that measures the received power. Each of the receivers 18 and 22 are connected to a controller 24 that processes the signals using known AoA algorithms to generate the best estimate of the direction of the received signal.

As is apparent from the discussion of the antenna system 10 above, a separate receiver is used for each separate antenna element 16 and 20. Typically, these types of interferometer antenna systems employ five or six antenna elements to provide the desired signal direction calculation accuracy, without overwhelming cost and space drawbacks. It is possible to provide such an interferometer antenna system having only two antenna elements, but accuracy is sacrificed and the antenna elements have to be located close together, within a half-wavelength of the received signal.

Because receivers are typically complex, and add significant hardware to the overall antenna system, it is desirable to reduce the number of receivers and the complexity of the system. Also, for smaller aircraft, where space constraints are of a significant concern, it is also desirable to reduce the overall system hardware because of space limitations. Further, it is typically desirable in many situations to reduce the overall cost of the system. However, it is desirable to provide these things without reducing the accuracy of the overall system.

What is needed is an interferometer antenna system for determining signal direction that reduces the complexity and cost of the existing systems. It is therefore an object of the present invention to provide such an angle of arrival interferometer system.

SUMMARY OF THE INVENTION

In accordance with the teachings of the present invention, an interferometer antenna system is disclosed for measuring the angle of arrival of RF signals. The interferometer antenna system includes a plurality of interferometer antenna elements coupled to a first switching network. The first switching network is coupled to only two interferometer receivers. The first switching network selectively connects the plurality of interferometer antenna elements in pairs to the two interferometer receivers in a sequential manner, so that a phase difference between the received signal for a combination of several of pairs of the interferometer elements can be generated. Additionally, a plurality of guard antenna elements are coupled to a second switching network. A single guard receiver is coupled to the second switching network, where the second switching network selectively connects one of the guard antenna elements to the guard receiver in a sequential manner.

A controller employs a suitable AoA algorithm to generate a best estimate of the direction of the received signal based on the phase signals from the two interferometer receivers and the power signal from the guard receiver. In one embodiment, the controller generates predicted or expected phase differences based on a nominal direction of arrival, and subtracts the predicted phase differences from the actual measured phase differences to generate a nominal phase difference. The controller performs a linear transform operation to rotate the nominal phase differences and align phase trajectories with one coordinate axis and place the ambiguities on other n−1 axes. A threshold is provided around the nominal coordinate axis based on an acceptance versus rejection probability to eliminate those received signals outside of a predetermined threshold range.

Additional objects, advantages and features of the present invention will become apparent to those skilled in the art from the following discussion and the accompanying drawings and claims.

DETAILED DESCRIPTION OF THE PREFERRED EMBODIMENTS

The following discussion of the preferred embodiments directed to an interferometer antenna system for measuring the angle of arrival of RF signals is merely exemplary in nature, and is in no way intended to limit the invention or its applications or uses As will be discussed in greater detail below, the present invention allows precision angle of arrival measurements of a signal to be made with a greatly reduced number of receivers as that needed in the conventional interferometer systems. The applications for which the receiver count can be reduced include those applications where the system geometry is stable enough and the signal duration is long enough that the phase and amplitudes of the signals from the various antenna elements can be measured sequentially, rather than simultaneously. This concept consists of measuring phase differences between elements in the linear array antenna two at a time by switching the desired pair of antenna elements to a pair of receivers. The signal amplitudes of ambiguity-resolution or guard antenna elements are measured sequentially by switching one antenna element at a time to a signal measurement receiver.

Additionally, in many applications, the interferometer system of the invention permits accuracy improvements for the same known antenna array configuration. The class of applications for which angle of arrival accuracy can be improved includes those applications where it is desired to determine angle of arrival only for signals arriving at a relatively narrow range of angles. Conventional angle of arrival algorithms treat all arrival angles equally in that they select the most likely direction of arrival, given the measured data. This innovation uses a less complex algorithm and initially postulates the signals coming from the range of directions of interest, then tests this hypothesis with each piece of measured data. If the data supports the hypothesis, an estimate of angle of arrival is made. If the hypothesis is not supported, the signal is rejected. By properly selecting the hypothesis testing threshold, the probability of correct selection can be traded against the probability of erroneous acceptance. This improves performance compared to conventional algorithms where the probabilities must be equal.

Figure 1:
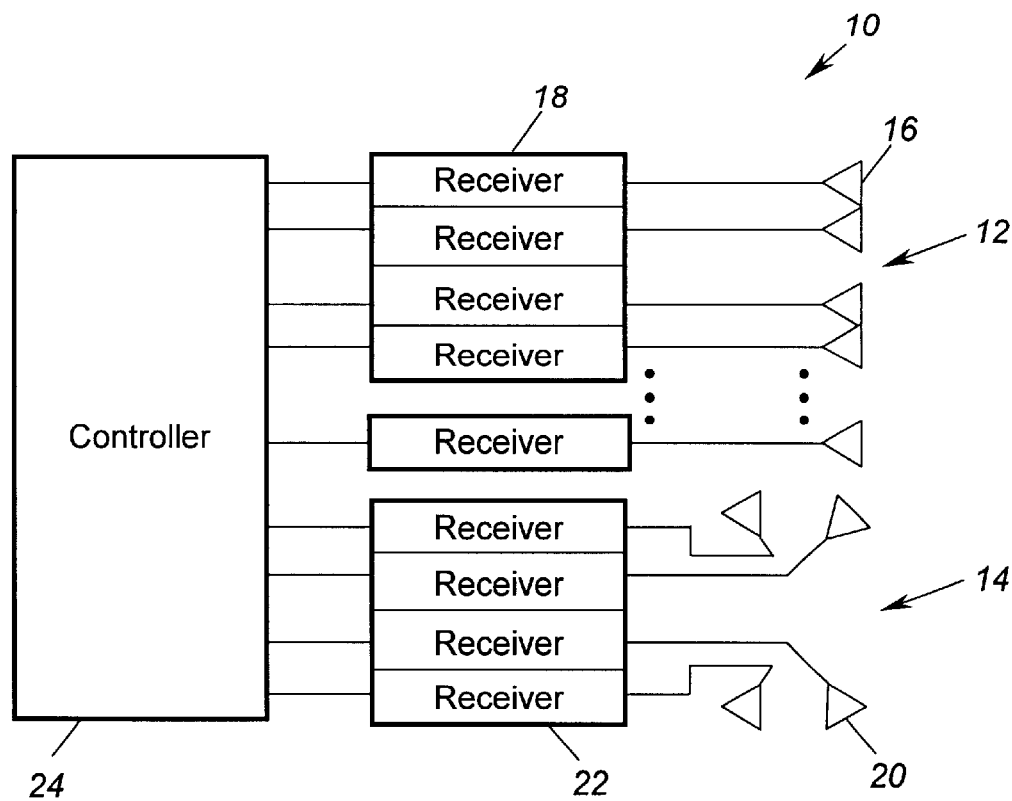
FIG. 1 is a block diagram of a conventional interferometer antenna system for determining angle of arrival of an RF signal.
Figure 2:
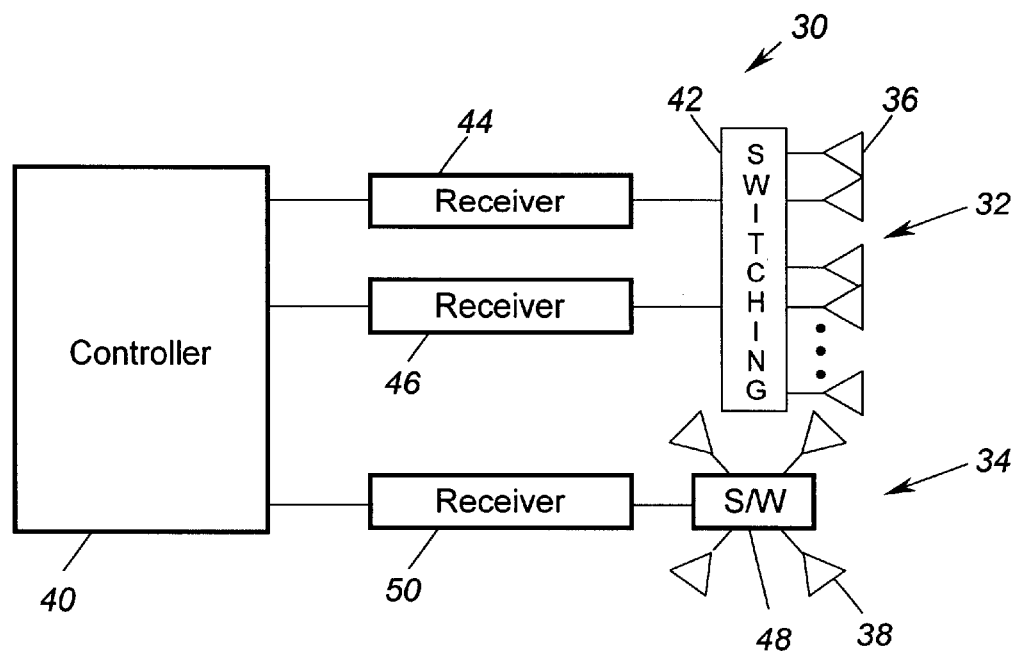
FIG. 2 is a block diagram of an interferometer antenna system for determining angle of arrival of an RF signal, according to an embodiment of the present invention.

FIG. 2 is a schematic block diagram of an antenna system 30 that is a variation of the antenna system 10, according to an embodiment of the present invention. The antenna system 30 also includes an interferometer antenna system 32 and a guard antenna system 34. The interferometer antenna system 32 includes a plurality of antenna elements 36, and the guard antenna system 34 includes four antenna elements 38 oriented 90° relative to each other, as shown. The antenna elements 36 and 38 can be any suitable antenna element for a particular application. For example, the antenna elements 36 and 38 can be conformal antenna elements formed in the structure of an aircraft. Further, a processor or controller 40 employs directional measurement or AoA algorithms that receive the data and provide the angle of arrival estimate calculations.

In order to reduce system complexity, the interferometer antenna system 32 includes an electronic switching network 42, and only two receivers 44 and 46. The two receivers 44 and 46 are provided to measure the phase difference of the signals received by any two of the elements 36 relative to each other. Two receivers are necessary so that a determination of the phase difference between any two selected antenna elements 36 can be determined. In accordance with any particular directional control scheme, the switching network 42 would selectively connect a particular set of two of the antenna elements 36 to the receivers 44 and 46 in a sequential manner.

In the guard antenna system 34, an electronic switching network 48 is provided that is connected to a single receiver 50. The switching network 48 selects one of the four antenna elements 38 in a sequential manner, and directs that signal to the receiver 50 depending on a particular application. The manner or order in which the guard antenna elements 38 are sequenced and the time each element 38 is measured would be application specific.

Instead of measuring the signals from each antenna element at the same time as in the conventional system 10, the system 30 of the present invention measures the various antenna elements 36 and 38 independently in a sequential manner. In order for the system 30 to work properly, the signal being received must be present for all or most of the time the sequential selecting of the antenna elements 36 and 38 is being performed.

As mentioned above, in certain applications, the antenna system 30 of the present invention provides greater angle of arrival accuracy over comparable antenna systems existing in the art. One of the limitations for this increased accuracy is that the signal is being received from a known general direction. For this discussion, p is the measured phase difference between each antenna element pair, where $p=(p_1, p_2, p_3 \ldots p_n)$ for all of the measurements. This is the basic data that is input into the algorithm. The measured phase difference p between the signal received by two elements is subtracted from an expected or predicted phase difference $p_{pred}$ to give a nominal phase difference $P=p-p_{pred}$. The nominal phase difference P thus should be near zero, such as within 5° to 10°.

Figure 3:
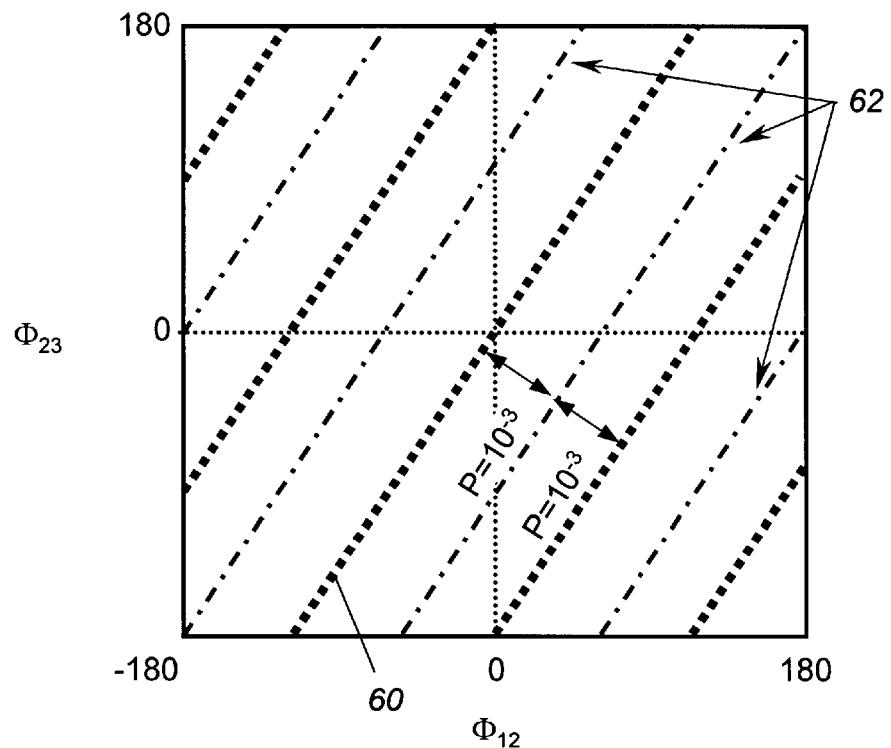
FIG. 3 is a graph showing full field-of-view processing of a 3:2 ratio, three element interferometer system of the present invention.

FIG. 3 is a graph depicting the full field-of-view processing results for a 3/2 ratio, three element interferometer system, where the ratio between the first and second antenna elements and the second and third antenna elements is 3/2. For example, the distance between the first and second antenna elements may be three inches, and the distance between the second and third antenna elements may be two inches. The horizontal axis gives the measured phase difference $p_{12}$ for signals received by the first and second antenna elements between −180° and 180°. The vertical axis gives the measured phase difference $p_{23}$ for signals received by the second and third antenna elements between −180° and 180°. Based on the 3/2 ratio, a signal coming from any direction relative to the interferometer system will fall on one of the bold dotted lines 60. If a data point falls near one of the lines 60, it can be resolved by moving it to the closest line 60. If the point falls exactly between any of the two lines 60, on one of the ambiguity lines 62, then the direction of the signal cannot be resolved.

To increase the ability to resolve the signal direction in the controller 40, the lines 60 and 62 can be rotated, for example, so that they are vertical in the graph shown in FIG. 3. To provide this rotation, the nominal phase difference P is multiplied by a transform matrix T to give a rotational phase difference $P_r=TP$. This linearly transforms the coordinates in the graph of FIG. 3 to align phase trajectories with one coordinate axis and place the ambiguities on other n−1 axes. If the signal is coming from the nominal direction, it would fall on the line 60 that goes through the location (00).

Figure 4:
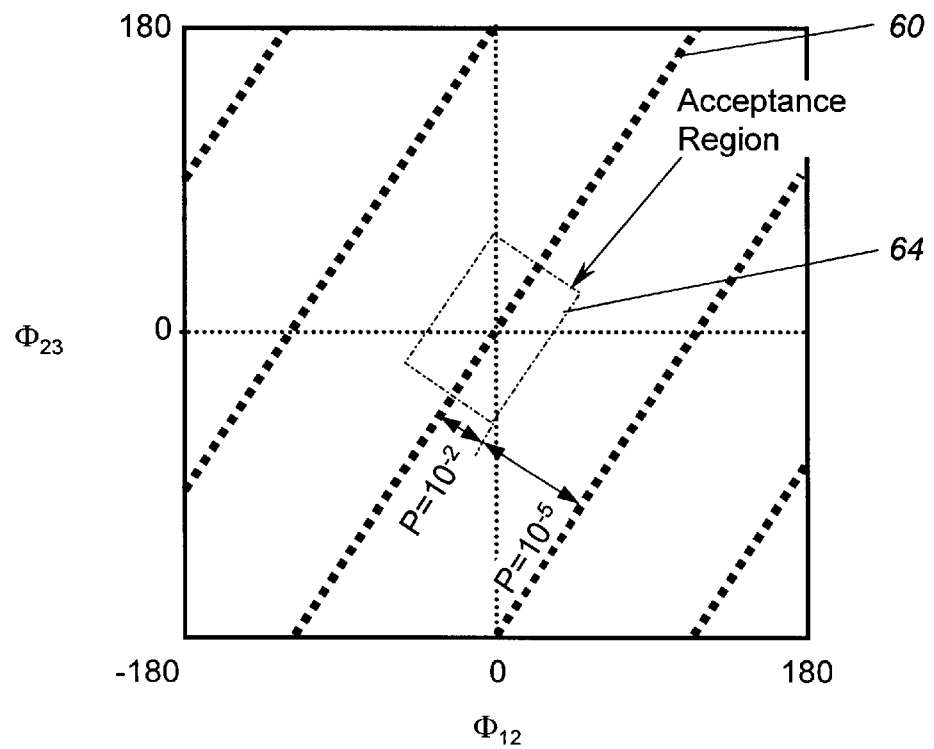
FIG. 4 is a graph showing restricted angle range processing for a 3:2 ratio, three element interferometer system of the present invention.

For the case where the signal is coming from a known nominal direction, a threshold can be identified around the location (00) to provide increased accuracy. FIG. 4 is the graph of FIG. 3 for a restricted angle range processing, where the ambiguity lines 62 have been eliminated. A threshold box 64 is placed around the location (00) so that any measured phase difference or nominal phase difference falling within the box (64) is determined to be the signal of interest and any measured phase difference falling outside the box 64 is rejected. A threshold is identified to be optimized for acceptance versus rejection probabilities. Therefore any data that is outside of this threshold is rejected if it differs sufficiently from zero. The threshold can be set to get exactly the probability of acceptance that is desired.

The foregoing discussion describes merely exemplary embodiments of the present invention. One skilled in the art would readily recognize that various changes, modifications and variations can be made therein without departing from the spirit and scope of the invention as defined in the following claims.

What is claimed is:

1. A system for determining angle of arrival measurements of a signal, said system comprising:
   a plurality of interferometer antenna elements spaced apart from each other a predetermined distance and receiving the signal, said plurality of interferometer antenna elements being greater in number than two antenna elements;
   a first switching network coupled to the plurality of interferometer antenna elements;
   two interferometer receivers coupled to the first switching network, said first switching network selectively directing the received signal from two selected interferometer antenna elements to the two interferometer receivers in a sequential manner so that several pairs of the interferometer antenna elements are separately directed to the two interferometer receivers; and
   a controller coupled to the interferometer receivers and determining a phase difference between measured phase differences of the two selected interferometer antenna elements, said controller subtracting a predicted phase difference from the determined phase difference to generate a nominal phase difference.

2. The system according to claim 1 wherein the interferometer antenna elements are arranged in a linear array.

3. A system according to claim 1 further comprising a plurality of guard antenna elements, a second switching network and a single guard receiver, said second switching network being coupled to the guard antenna elements and the guard receiver, and selectively directing the signal received by the guard antenna elements in a sequential and separate manner to the guard receiver, said controller being coupled to the guard receiver.

4. The system according to claim 1 wherein the nominal phase difference is compared to a threshold where phase differences below the threshold are accepted and phase differences above the threshold are rejected.

5. The system according to claim 1 wherein the controller performs a linear transform on the nominal phase difference to align phase trajectories with one coordinate axis and place ambiguities on other axes.

6. The system according to claim 1 wherein the antenna elements are positioned on an aircraft.

7. A system for determining direction of arrival of a received signal, said system comprising:
   a plurality of interferometer antenna elements spaced apart from each other a predetermined distance and receiving the signal, said plurality of interferometer antenna elements being more than two antenna elements arranged in a linear array;
   a first switching network coupled to the plurality of interferometer antenna elements;
   only two interferometer receivers coupled to the first switching network, said first switching network selectively directing the received signals from two selected interferometer antenna elements to the two interferometer receivers in a sequential manner so that several pairs of the interferometer antenna elements are separately directed to the two interferometer receivers, said interferometer receivers measuring a phase difference therebetween;
   four guard antenna elements oriented 90° apart and receiving the signal;
   a second switching network coupled to the four guard antenna elements;
   a single guard receiver, said second switching network selectively directing the received signal from selected guard antenna elements in a sequential and separate manner to the guard receiver; and
   a controller coupled to the interferometer receivers and the guard receiver, said controller determining a phase difference between the measured phase differences of the two selected interferometer elements and determining a power of the selected guard antenna element.

8. The system according to claim 7 wherein the controller subtracts a predicted phase difference from the determined phase difference to generate a nominal phase difference.

9. The system according to claim 8 wherein the nominal phase difference is compared to a threshold where phase differences below the threshold are accepted and phase differences above of the threshold are rejected.

10. The system according to claim 8 wherein the controller performs a linear transform on the nominal phase difference to align phase trajectories with one coordinate axis and place ambiguities on other axes.

11. The system according to claim 7 wherein the antenna elements are positioned on an aircraft.

12. A method of determining the angle of arrival of a signal, said method comprising the steps of:
   selecting a first pair of interferometer antenna elements from a plurality of interferometer antenna elements;
   connecting the first selected pair of interferometer antenna elements to a pair of interferometer receivers;
   measuring the phase difference between signals received by the first selected interferometer elements;

subtracting a predicted phase difference from the measured phase difference between the signals received by the first selected interferometer elements to generate a nominal phase difference;

selecting a second pair of interferometer antenna elements from the plurality of interferometer antenna elements that is different than the first pair of interferometer antenna elements;

connecting the second selected pair of interferometer antenna elements to the same pair of interferometer receivers;

measuring the phase difference been signals received by the second selected interferometer elements; and determining the angle of arrival of the signal received by the interferometer antenna elements based on the measured phase differences, said step of determining the angle of arriving including subtracting a predicted phase difference from each measured phase difference to generate a nominal phase difference.

13. The method according to claim 12 further comprising the steps of selecting a guard antenna element from a plurality of guard antenna elements, connecting the selected guard antenna element to a single guard receiver, measuring the signal power received by the selected guard antenna element, and sequentially repeating the steps of selecting a guard antenna elements, connecting the guard antenna element to the guard receiver and measuring the signal power received by the selected guard antenna sequentially for all of the plurality of guard antenna elements.

14. The method according to claim 12 further comprising the step of comparing the nominal phase difference to a threshold and rejecting the nominal phase difference if it is greater than the threshold.

15. The method according to claim 12 further composing the step of performing a linear transform on the nominal phase difference to align phase trajectories with one coordinate axes and place ambiguities on other axes.

16. A method of determining the angle of arrival of a signal, said method comprising the steps of:

providing at least two interferometer antenna elements;

measuring the phase of the signal received by each of the interferometer antenna elements;

determining the phase difference between the measured phases of the signals received by the interferometer elements; and performing a linear transform on the phase difference to rotate phase trajectories represented by the phase difference to be aligned with a coordinate axis.

17. The method according to claim 16 further comprising the step of subtracting a predicted phase difference from the determined phase difference to generate a nominal phase difference, said step of performing a linear transform including performing the linear transform on the nominal phase difference.

18. The method according to claim 17 further comprising the step of comparing the nominal phase difference to a threshold and rejecting the nominal phase difference if it is greater than the threshold.

19. A system for determining angle of arrival measurements of a signal, said system comprising:

a plurality of interferometer antenna elements spaced apart from each other a predetermined distance and receiving the signal, said plurality of interferometer antenna elements being greater in number than two antenna elements;

a first switching network coupled to the plurality of interferometer antenna elements;

two interferometer receivers coupled to the first switching network, said first switching network selectively directing the received signal from two selected interferometer antenna elements to the two interferometer receivers in a sequential manner so that several pairs of the interferometer antenna elements are separately directed to the two interferometer receivers;

a plurality of guard antenna elements;

a second switching network coupled to the plurality of guard antenna elements;

a single guard receiver coupled to the second switching network, said single guard receiver selectively directing the signal received by the guard antenna elements in a sequential and separate manner to the guard receiver; and a controller coupled to the interferometer receivers and the guard receiver, said controller determining a phase difference between measured phase differences of the two selected interferometer antenna elements.

20. A method of determining the angle of arrival of a signal, said method comprising the steps of:

selecting a first pair of interferometer antenna elements from a plurality of interferometer antenna elements;

connecting the first selected pair of interferometer antenna elements to a pair of interferometer receivers;

measuring the phase difference between signals received by the first selected interferometer elements;

selecting a second pair of interferometer antenna elements from the plurality of interferometer antenna elements that is different than the first pair of interferometer antenna elements;

connecting the second selected pair of interferometer antenna elements to the same pair of interferometer receivers;

measuring the phase difference between signals received by the second selected interferometer elements;

selecting a guard antenna element from a plurality of guard antenna elements;

connecting the selected guard antenna element to a single guard receiver;

measuring the signal power received by the selected guard antenna element;

sequentially repeating the steps of selecting a guard antenna element, connecting the guard antenna element to the guard receiver and measuring the signal power received by the selected guard antenna element sequentially for all of the plurality of guard antenna elements; and determining the angle of arrival of the signal received by the interferometer antenna elements based on the measured phase differences.

* * * * *